United States Patent [19]

Yoshihara

[11] Patent Number: 4,871,973
[45] Date of Patent: Oct. 3, 1989

[54] DEMODULATOR INCLUDING SWEEP CONTROLLER FOR CONTROLLING SYNCHRONIZATION CAPTURE RANGE

[75] Inventor: Masashi Yoshihara, Tokyo, Japan
[73] Assignee: NEC Corporation, Japan
[21] Appl. No.: 193,545
[22] Filed: May 12, 1988
[30] Foreign Application Priority Data May 19, 1987 [JP] Japan .................................. 62-121959

[51] Int. Cl.⁴ .............................................. H03D 3/18
[52] U.S. Cl. ...................................... 329/308; 375/81
[58] Field of Search ................. 329/50, 107, 109, 110, 329/122, 124, 135; 375/39, 81, 82, 86, 97, 120; 455/214, 255, 257, 259, 260, 264, 265, 337; 331/4, DIG. 2

[56] References Cited

U.S. PATENT DOCUMENTS 4,000,476  12/1976  Walker et al. .................. 329/122 X
4,079,329  3/1978   England et al. ...................... 329/50
4,691,377  9/1987   Yoshihara et al. ............... 375/97 X

OTHER PUBLICATIONS

"AIAA 10th Communication Satellite Systems Conference", a Collection of Technical Papers, Orlando, Fla., Mar. 19-22, 1984.

Primary Examiner—David Mis
Attorney, Agent, or Firm—Laff, Whitesel, Conte & Saret

[57] ABSTRACT

A PSK demodulator uses a sweep controller to broaden a range in which synchronism may be captured. The invention uses a decision circuit jointly based on a received PSK signal and a recovered carrier wave for making a soft decision as to the correction required for synchronism. An error voltage is developed responsive to a phase error for causing the sweep controller to sweep when there is no synchronism and to remain fixed when there is synchronism. The resulting circuit eliminates false synchronism indications.

6 Claims, 2 Drawing Sheets

DEMODULATOR INCLUDING SWEEP CONTROLLER FOR CONTROLLING SYNCHRONIZATION CAPTURE RANGE

BACKGROUND OF THE INVENTION

The present invention relates to a multi-phase PSK (Phase Shift Keying) demodulator and, more particularly, to a demodulator of the type including a sweep controller for broadening a synchronization capture range and which is capable of removing false synchronization.

A demodulator of the type described is basically made up of a quadrature detector for detecting an input PSK signal by a recovered carrier wave. Analog-to-digital (A/D) converters are connected to the outputs of the quadrature detector. An error correction/synchronization decision circuit is connected to the output of the A/D converters for producing both demodulated data and a synchronization decision signal. A carrier recovery circuit produces the recovered carrier wave from the outputs of the quadrature detector or the outputs of the A/D converters. A sweep controller controls the frequency of the recovered carrier wave in response to the synchronization decision signal to change the synchronization capture range.

A problem with the above-described demodulator is that when a certain relationship holds between the synchronization capture range and the symbol rate, the demodulator falsely decides that synchronization has been established when it has not been set up. This kind of occurrence is generally referred to as false synchronization and will be described in detail later.

SUMMARY OF THE INVENTION

It is, therefore, an object of the present invention to provide a demodulator capable of cancelling false synchronization, when it occurs.

A demodulator of the present invention is of the type including error correction/synchronization decision circuit means for applying an error correction to two sequences of demodulated data for making a soft decision. The two sequences produced on the basis of a received input PSK signal and a recovered carrier wave to produce error-corrected demodulated data and a synchronization decision signal. A sweep controller means generates a sweep signal when the synchronization decision signal is representative of a "not synchronous" operation. An output of the sweep controller is maintained at a predetermined level when the decision signal is representative of "synchronous" operation. A carrier; recovery circuit means produces an error voltage representative of a phase error which is determined by using the two sequences of demodulated data for making a soft decision and adding an output of a loop filter which is associated with the error voltage and an output of the sweep controller. A control voltage is produced for controlling a voltage controlled oscillator which produces the recovered carrier wave.

The demodulator comprises filter means for filtering the error voltage. The filter has a lower frequency limit which is close to an upper frequency limit of the loop filter. A detector means detects an output of the filter means. Comparator means compares an output voltage of the detector and a reference voltage. When the output voltage is higher than the reference voltage, the comparator delivers a control signal to the sweep controller means. The sweep controller means resumes the generation of the sweep signal in response to the control signal which is applied to the sweep controller means while the sweep controller means is holding the predetermined level.

Also, a demodulator of the present invention comprises quadrature detector means for demodulating a PSK signal in response to a carrier wave to provide demodulated signals. Synchronization decision means responds to the demodulated signals for deciding whether or not synchronization is established, and provides a first control signal. A carrier recovery circuit means including voltage controlled oscillator means for providing an error voltage in response to the demodulated signals. The voltage controlled oscillator means provides carrier waves in response to the error voltage. A false synchronization detecting means detects a false synchronization by monitoring the error voltage, thereby providing a second control signal. A sweep controller means for supplies a sweep signal or a predetermined level signal to the input of the voltage controlled oscillator means in response to the first and second control signals.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENT

Figure 1:
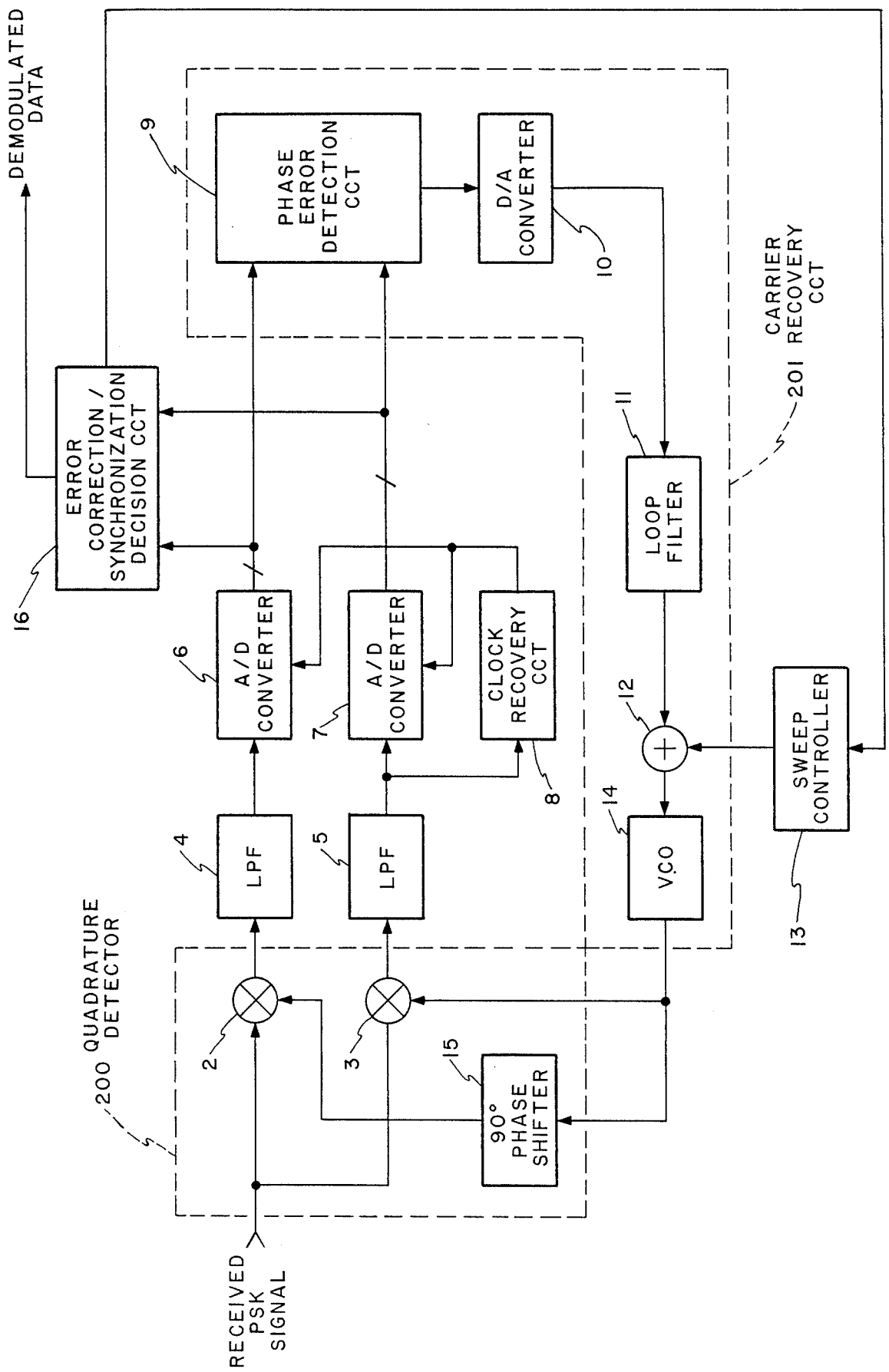
FIG. 1 is a block diagram schematically showing a prior art demodulator.

To better understand the present invention, a brief reference will be made to a prior art demodulator, shown in FIG. 1. As shown, the demodulator is basically constituted by mixers 2 and 3, low pass filters (LPFs) 4 and 5, A/D converters 6 and 7, a clock recovery circuit 8, a phase error detecting circuit 9, a digital-to-analog (D/A) converter 10, a loop filter 11, a voltage adder 12, a sweep controller 13, a voltage controlled oscillator (VCO) 14, a 90° phase shifter 15, and an error correction/synchronization decision circuit 16.

A received PSK signal is applied to one input of the mixer 2 and one input of the mixer 3. Applied to the other input of the mixer 2 is an output of the 90° phase shifter 15 which is adapted to shift an output of the VCO 14 by 90°. Applied to the other input of the mixer 3 is the output of the VCO 14. These circuits 2 and 3 in combination constitute a quadrature detector 200.

In the above construction, a baseband signal appears on the output of each of the mixers 2 and 3. The baseband signals are individually subjected to waveform shaping and noise reduction processing at the low pass filters 4 and 5. Then, the shaped waves are converted into digital signals each having a desired number of bit at the A/D converters 6 and 7. These digital signals, or two sequences of demodulated data for soft decision, are fed to the error correction/synchronization decision circuit 16 and to the phase error detecting circuit 9, respectively.

The clock recovery circuit 8 feeds a sampling clock to the A/D converters 6 and 7. Specifically, the clock recovery circuit 8 extracts a clock component from the output of the low pass filter 5 to thereby produce a predetermined sampling clock. It is to be noted that, in 2-phase PSK, the output of the low pass filter 5 is the received demodulated signal of a cosine signal. The circuitry for producing demodulated data for soft decision is operated as described above.

The error correction/synchronization decision circuit 16 applies an error correction to the outputs of the A/D converters 6 and 7, i.e., two sequences of demodulated data while deciding whether or not synchronization has been established. The circuit 16 delivers demodulated data 17 which has undergone error correction to the outside while feeding a signal representative of the result of the decision to the sweep controller 13. Major components of the circuit 16 are a synchronizer, a branch metric calculator, an ACS (Addition, Comparison and Selection) circuit, a path memory, a metric memory, a differential decoder, and an Exclusive-OR gate.

The above-mentioned decision signal or a clear signal from the synchronizer is received by the sweep controller 13, which includes at least a sweep signal generator. Controller 13 generates a sweep signal when the input signal is representative of a "not synchronous" condition and maintains its output at a predetermined level when the input signal is representative of a "synchronous" condition. The output of the sweep controller 13 is connected to one input terminal of the voltage adder 12.

The phase error detecting circuit 9, D/A converter 10, loop filter 11, voltage adder 12 and VCO 14 constitute a carrier recovery circuit 201. The sweep controller 13 broadens the synchronization capture range. The phase error detector 9 serves to detect a phase error of the two sequences of demodulated data for making a soft decision. The detected phase error is converted into an error voltage by the D/A converter 10, the error voltage being applied to the other input of the voltage adder 12 via the loop filter 11. As a result, the VCO 14 obtains a predetermined control voltage from the voltage adder 12 to recover a carrier wave.

For details of this kind of demodulator, except for the sweep controller 13, a reference may be made to K. Yano et al. "A Satellite Communication System for Teleconferencing in 30/20 GHz Band", AIAA 10th Communication Satellite Systems Conference, A collection of technical papers, pp. 159–171, especially FIGS. 3-4 and 3-5, March 19-22, 1984.

The carrier recovery circuit 201 may be constructed to recover a carrier wave from the outputs of the low pass filters 4 and 5, as shown in FIG. 3-4 of the above Yano et al document. Further, the carrier recovery circuit 201 may be implemented with a carrier synchronizing circuit which is disclosed in U.S. Pat. No. 4,574,246 issued March 4, 1986. As for the synchronization of an error correcting decoder, a reference may be made to U.S. Pat. No. 3,872,432.

As stated earlier, a problem with the prior art demodulator is that, when a certain relationship holds between the synchronization capture range and the symbol rate, the demodulator decides that synchronization has been established despite the fact that it has not been established. Such false synchronization should be eliminated.

Specifically, assume that the synchronization capture range $\Delta F$ and the symbol rate $f_s$ are related as represented by:

$$f_s/4 < |\Delta F| < f_s/2$$

Then, when the difference between the carrier frequency of the received PSK signal and the output frequency of the VCO 14 is $f_s/4$, $f_s/8$, $f_s/16$ or the like, the error correction/synchronization decision circuit 16 erroneously determines that synchronization has been established. The sweep controller 13 responds even to such a false synchronization by interrupting the generation of a sweep signal and maintaining a predetermined output level.

The present invention is successful in eliminating the above-discussed false synchronization, as described in detail hereunder.

Figure 2:
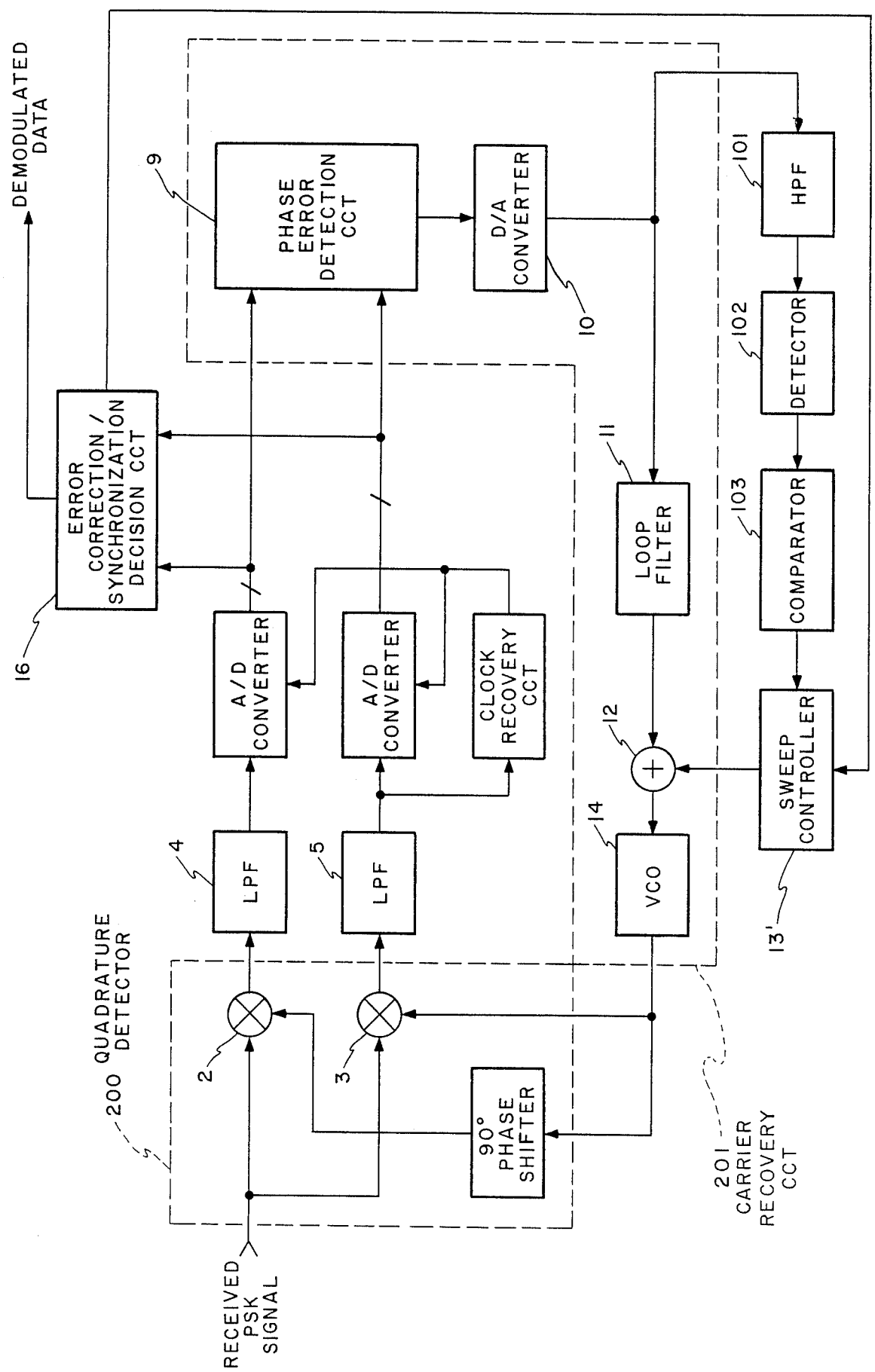
FIG. 2 is a schematic block diagram showing a demodulator in accordance with the present invention.

FIG. 2 shows a demodulator embodying the present invention. In the figure, the structural elements which are the same or similar as those shown in FIG. 1 are designated by like reference numerals and details thereof will not be described to avoid redundancy.

As shown, the demodulator of FIG. 2 includes a sweep controller 13' in place of the prior art sweep controller 13. Connected between the sweep controller 13' and a D/A converter 10 are a high pass filter (HPF) 101, a detector 102, and a comparator 103.

The sweep controller 13' is analogous to the prior art sweep controller 13, but only in that when a synchronization decision signal is representative of a "synchronous" condition, it stops generating a sweep signal and maintains a predetermined output level. In accordance with the present invention, even when the decision signal is representative of a "synchronous condition", the sweep controller 13' resumes the generation of a sweep signal in response to a control signal which may be fed thereto from a comparator 103 as will be described.

An error correction/synchronization decision circuit 16 determines that synchronization has been established in response to both the true synchronization and the false synchronization. Even under the false synchronization condition, the sweep controller 13' stops generating a sweep signal and holds its output at a predetermined level.

In the event of false synchronization, a heat component whose frequency is $N \times f_s/4$, $N \times f_s/8$ or the like is superposed on the output (error voltage) of the D/A converter 10. The reference N is the phase number of PSK signal. This beat component has a frequency which is higher than the upper frequency limit of a loop filter 11. For this reason, a high pass filter 101 adapted to filter the error voltage is provided with a lower frequency limit which is close to the upper frequency limit of the loop filter 11. The high pass filter 101, therefore, is capable of extracting a beat component from the error voltage and delivering it to a detector 102.

The detector 102 detects the input beat component signal. Receiving an output of the detector 102, the comparator 103 compares the output of the detector 102 with a predetermined reference voltage. When the output of the detector 102 is higher than the reference voltage, the comparator 103 feeds the previously mentioned control signal to the sweep controller 13'. As a result, the sweep controller 13' resumes the generation of a sweep signal, i.e., the false synchronization is cancelled.

While a false synchronization is successfully cancelled, as stated above, there is a fear that the true synchronization may also be cancelled, i.e., the fear of a true synchronization being erroneously determined to be a false one.

In accordance with the present invention, there is no such fear for the following reason. Even if the ratio of energy per bit ($E_b$) to noise power density ($N_o$), i.e., $E_b/N_o$, is deteriorated within the practical or communicable range while true synchronization is established and maintained, the noise component in the output of the high pass filter 101 is not influential because the noise band is limited by low pass filters 4 and 5. Hence, the output voltage of the detector 102 is low. The reference voltage is determined on the basis of the magnitude of the beat component. Since the beat component has a substantial degree of influence, the reference voltage can be adequately set up to eliminate erroneous detection as stated above.

In summary, it will be seen that the present invention provides a demodulator which cancels false synchronization by detecting it and causing a sweep controller to resume the generation of a sweep signal in response to a signal representative of the detection of false synchronization.

Those who are skilled in the art will readily perceive how to modify the invention. Therefore, the appended claims are to be construed to cover all equilvalent structures which fall within the true scope and spirit of the invention.

What is claimed is:

1. A demodulator having error correction/synchronization decision circuit means for applying an error correction to two sequences of demodulated data for making soft decisions which are produced on a basis of a received input PSK signal and a recovered carrier wave to produce error-corrected demodulated data and a synchronization decision signal, quadrature detector means for producing the two sequences of demodulated data, sweep controller means for generating a sweep signal when the synchronization decision signal is representative of a "not synchronous" condition, and for maintaining an output of said sweep controller means at a predetermined level when the synchronization decision signal is representative of a "synchronous" condition, a voltage controlled oscillator, and carrier recovery circuit means responsive to the two sequences of demodulated data for producing an error voltage, that is representative of a phase error which is determined with the two sequences of demodulated data for making a soft decision and for adding an output of a loop filter which is associated with the error voltage and an output of said sweep controller means to produce a control voltage for controlling said voltage controlled oscillator which produces the recovered carrier wave, said demodulator comprising:

filter means coupled to said carrier recovery circuit means and to said sweep controller means for filtering the error voltage, said filter means having a lower frequency limit which is close to an upper frequency limit of said loop filter;

detector means for detecting an output of said filter means; and comparator means for comparing an output voltage of said detector and a reference voltage, said comparator means delivering a control signal to said sweep controller means when the output voltage is higher than the reference voltage;

said sweep controller means resuming a generation of the sweep signal in response to the control signal which is applied to said sweep controller while said sweep controller means is holding the predetermined level.

2. A demodulator comprising:

quadrature detector means for demodulating a PSK signal in response to a carrier wave to provide demodulated signals;

synchronization decision means responsive to said demodulated signals for deciding whether or not synchronization is established, and for providing a first control signal;

carrier recovery circuit means for providing an error voltage in response to said demodulated signals, voltage controlled oscillator means providing said carrier wave in response to said error voltage;

false synchronization detection means for detecting a false synchronization by monitoring said error voltage to provide a second control signal; and sweep controller means for supplying a sweep signal or a predetermined level signal to the input of said voltage controlled oscillator means in response to said first and second control signals, and for resuming a generation of the sweep signal in response to the second control signal while said synchronization decisions means detects the establishment of synchronization.

3. A demodulator as claimed in claim 2, wherein said false synchronization detecting means comprises filter means for filtering said error voltage; level detector means for detecting an output level of said filter means; and comparator means for comparing an output voltage of said level detector means and a reference voltage to provide said second control signal.

4. A demodulator as claimed in claim 2, wherein said quadrature detector means comprises a phase shifter for providing a 90° phase shifted carrier wave in response to said carrier wave; and a pair of mixers for mixing said PSK signal with said carrier wave and 90° phase shifted carrier wave for providing said demodulated signals.

5. A demodulator as claimed as claim 2, wherein said carrier recovery circuit means further comprises loop filter means for filtering said error voltage and supplying it to the input of said voltage controlled oscillator means.

6. A demodulator comprising:

quadrature detector means for demodulating a PSK signal in response to a carrier wave to provide demodulated analog signals;

converter means for converting said demodulated analog signals to digital signals;

synchronization decision means responsive to said digital signals for deciding whether or not synchronization is established, and for providing a first control signal;

carrier recovery circuit means including voltage controlled oscillator means for providing an error voltage in response to said digital signals, said voltage controlled oscillator means providing said carrier wave in response to said error voltage;

false synchronization detecting means for detecting a false synchronization by monitoring said error voltage and providing a second control signal; and sweep controller means for supplying a sweep signal or a predetermined level signal to the input of said voltage controlled oscillator means in response to said first and second control signals, and for resuming a generation of the sweep signal in response to the second control signal while said sweep controller means is holding the predetermined level.

* * * * *